United States Patent
Li et al.

(10) Patent No.: US 12,335,393 B1
(45) Date of Patent: Jun. 17, 2025

(54) INTELLIGENT PHOTO ALBUM SORTING AND PRIVACY PROTECTION METHOD

(71) Applicant: Shenzhen Anke Batten Technology Co., LTD, Shenzhen (CN)

(72) Inventors: Shian Li, Shenzhen (CN); Qiufang He, Shenzhen (CN)

(73) Assignee: Shenzhen Anke Batten Technology Co., LTD, Shenzhen (CN)

( * ) Notice: Subject to any disclaimer, the term of this patent is extended or adjusted under 35 U.S.C. 154(b) by 0 days.

(21) Appl. No.: 18/830,499

(22) Filed: Sep. 10, 2024

(30) Foreign Application Priority Data

Dec. 18, 2023 (CN) .......................... 202311741816.5

(51) Int. Cl.
| | | |
|---|---|---|
| H04L 9/32 | (2006.01) |
| G06V 10/40 | (2022.01) |
| G06V 10/764 | (2022.01) |
| G06V 20/30 | (2022.01) |
| G06V 20/62 | (2022.01) |
| G06V 40/10 | (2022.01) |

(52) U.S. Cl.
CPC .............. *H04L 9/321* (2013.01); *G06V 10/40* (2022.01); *G06V 10/764* (2022.01); *G06V 20/30* (2022.01); *G06V 20/63* (2022.01); *G06V 40/10* (2022.01)

(58) Field of Classification Search
CPC ...... H04L 9/321; G06V 10/40; G06V 10/764; G06V 20/30; G06V 20/63; G06V 40/10
USPC ........................................................ 380/243
See application file for complete search history.

(56) References Cited

U.S. PATENT DOCUMENTS

2022/0075836 A1* 3/2022 Carbune .............. G06F 16/9538

FOREIGN PATENT DOCUMENTS

| CN | 108062405 A | | 5/2018 | |
| CN | 110399748 A | * | 11/2019 | |
| CN | 111371999 A | * | 7/2020 | |
| CN | 112101367 A | | 12/2020 | |
| CN | 114070950 A | * | 2/2022 | ......... H04N 1/32144 |
| CN | 116248842 B | * | 8/2023 | |
| KR | 20190076254 A | * | 7/2019 | |

* cited by examiner

*Primary Examiner* — Kambiz Zand
*Assistant Examiner* — Aubrey H Wyszynski
(74) *Attorney, Agent, or Firm* — Nitin Kaushik

(57) ABSTRACT

Disclosed in the present invention is an intelligent photo album sorting and privacy protection method. The method is applied to an image recognition model, and includes the following steps: obtaining shooting time and shooting locations of images, and acquiring latitude and longitude information of a shooting device; extracting feature information in the images; performing classification and sorting based on the shooting time and the shooting locations of the images and the extracted feature information in the images, and when a designated classified photo album exists in the shooting device, moving the images into the designated classified photo album; otherwise, creating a designated classified photo album, and moving the images into the designated classified photo album; after moving the images to the designated classified photo album, determining whether the recognition model has been stored in a model.

5 Claims, 7 Drawing Sheets

INTELLIGENT PHOTO ALBUM SORTING AND PRIVACY PROTECTION METHOD

CROSS-REFERENCE TO RELATED APPLICATIONS

The application claims priority to Chinese patent application No. 2023117418165, filed on Dec. 18, 2023, the entire contents of which are incorporated herein by reference.

TECHNICAL FIELD

The present invention relates to the field of photo album sorting technologies, more specifically to an intelligent photo album sorting and privacy protection method.

BACKGROUND

When there are a large number of pictures in a smart terminal (such as a mobile phone) of a user who has no habit of sorting the pictures, suddenly one day it will be very troublesome to look for a previously captured photo such as an identity card. By means of automatic sorting, data, persons, documents, and the like can be quickly found or searched for. In addition, the private information such as the identity card stored in a photo album of the mobile phone may be abused by malicious applications and is desired to be automatically protected. Moreover, in the existing technical solution, the user performs manual sorting, which is equivalent to no sorting for users who have no habit of sorting. Furthermore, images of different scenes such as multiple persons and different locations cannot be sorted or the sorting effect is unsatisfactory by a facial recognition technology.

There are the following drawbacks in the prior art:
1. Various technologies are not fully utilized or combined for processing.
2. There is a lack of privacy control, which leads to abuse of data by malicious applications.
3. A confidential device is uncontrollable.

SUMMARY

In view of this, an objective of the present invention is to provide an intelligent photo album sorting and privacy protection method, which overcomes the shortcomings in the prior art that captured photos cannot be automatically sorted and need to be manually sorted by a user, and a confidential device is uncontrollable, such that the method can automatically sort photos in a photo album, and can effectively control confidential and private content and prevent the risk of abuse by malicious applications.

To achieve the above objective, the present invention provides the following technical solution:

An intelligent photo album sorting and privacy protection method, where the method is applied to an image recognition model, and includes the following steps:
Step 1: monitoring a photo album in real time: acquiring images, and in response to monitoring that the images in the photo album are changed, immediately triggering a sorting action;
Step 2: reading image information: obtaining shooting time and shooting locations of the images, and acquiring latitude and longitude information of a shooting device;
Step 3: performing image recognition: extracting feature information in the images, where the feature information includes characters, the number of the characters, text content, and other scene information;
Step 4: performing content analysis and classification: performing classification and sorting based on the shooting time and the shooting locations of the images and the extracted feature information in the images, checking whether a designated classified photo album exists in the shooting device, and when the designated classified photo album exists, moving the images into the designated classified photo album; or when no designated classified photo album exists, prompting a user whether to create a designated classified photo album: if yes, creating the photo album, and moving the images into the designated classified photo album; or if not, temporarily abandoning the sorting, and waiting for next processing;
Step 5: performing model storage: after moving the images to the designated classified photo album, determining whether the recognition model has been stored in a model: if yes, proceeding to Step 6; or if not, storing the model, and then proceeding to a next step;
Step 6: performing image encryption: selecting whether to encrypt the images or not based on user settings and scene information: if yes, encrypting the images, and then proceeding to Step 7; or if not, directly proceeding to a next step;
Step 7: storing tag information: creating tags for the images to facilitate quick retrieval of the model in a later period, where the tags may be stored additionally or written into the images; and
Step 8: performing image number detection: detecting the number of the images, and when a plurality of images or videos are detected, prompting the user whether to combine the videos: if yes, intelligently combining the videos; or if not, ending the process; and in response to detecting that the number of the images is insufficient, ending the process.

Further, the method for image recognition in the Step 3 includes:
Step 311: performing text detection on the image information: in response to detecting that texts exist in the images, recognizing the texts in the images by a text recognition algorithm, and outputting the text content based on a recognition result; or when no texts exist in the images, recognizing the image information by an image recognition algorithm, determining a classification of target images based on a recognition result, and returning classified data; and
Step 312: performing text classification based on the recognized text content in the images, and returning classified data; and
the Step 4 of content analysis and classification involves four major classifications: characters, locations, content, and others.

Further, the method for classifying the characters includes:
Step 411: detecting the number of the characters in the images of the photo album;
Step 412: extracting information on the number of the characters in the images, recognizing by the image recognition model, and comparing with a character database in the image recognition model: when no contained character information exists in the character database, prompting the user to set up a database for the character information in the images, and after the user sets up the database for the character information in the images, extracting classification tags; or when contained character information exists in the database, directly extracting classification tags; and Step 413: monitoring private information of the character information in the images, and generating private tags.

Further, the method for classifying the locations in the Step 4 includes:

Step 421: recognizing whether the locations in the images are confidential: in response to recognizing that the locations in the images are confidential institutions, generating confidentiality tags, and recognizing whether the characters exist in the images: when the characters exist, extracting the character information in the images for character classification, and generating tags related to the locations and the characters; or when no characters exist in the images, generating tags related to the locations; and Step 422: in response to recognizing that the locations in the images are not confidential locations, detecting whether the characters exist in the images: in response to detecting that the characters exist in the images, extracting the character information in the images for character classification, and generating tags related to the locations and the characters; or when no characters exist in the images, generating tags related to the locations.

Further, the method for classifying the content includes:

Step 431: acquiring content information of the images in the photo album;

Step 432: performing content correction on the acquired content information in the images to obtain corrected content information;

Step 433: recognizing the corrected content information: recognizing information on documents, contracts, invoices, assignments, courseware, or system screenshots in the content information;

Step 434: in response to recognizing that the content information in the images is document or contract content, generating encryption tags, and generating content tags and full texts; and Step 435: in response to recognizing that the content information in the images refers to the invoices, the assignments, the courseware, or the system screenshots, directly generating content tags.

Further, performing image encryption on the images by an encryption algorithm in the Step 8 includes the following steps:

Step 81: encrypting all the images based on the user settings to prevent unauthorized applications from acquiring image data;

Step 82: automatically adapting an encryption range for confidential images based on the user settings or authentication by a confidentiality authentication center, for example, automatically encrypting all the images;

Step 83: encrypting all the images, and then deleting the original images;

Step 84: recognizing whether the shooting device is a confidential device: if yes, automatically encrypting the captured images, and prohibiting the images from being accessed by other applications;

Step 85: automatically encrypting the images based on the shooting locations and content of the images, and determining whether encryption tags exist in the images;

Step 86: when the encryption tags exist in the images, encrypting the images by the encryption algorithm, and ensuring that the encrypted images are incapable of being parsed by other applications; and Step 87: uploading an operation behavior for the encrypted images in the confidential device to the confidentiality authentication center.

Further, a method for recognizing controlled content in the step S82 includes:

initiating an authentication request to the confidentiality center service by a shooting terminal, and separately detecting whether the shooting device, personnel in the images, the locations of the images, and the content of the images are the controlled content: if so, authenticating the shooting device, the personnel in the images, the locations of the images, and the content of the images as the controlled content; otherwise, authenticating the shooting device, the personnel in the images, the locations of the images, and the content of the images as uncontrolled content.

Further, a method for managing the operation behavior for the encrypted images in the Step 87 includes:

when a sharing, copying or moving operation is performed on the encrypted images in the images, determining based on a confidentiality level of the content: in response to determining that the confidentiality level is a high level, prohibiting the operation or only permitting the operation to another encryption device; or in response to determining that the confidentiality level is not a high level, permitting the operation, and recording an operation record and uploading the operation record to a confidentiality control center;

when encrypted files in the images are viewed, determining based on the confidentiality level of the content: when the confidentiality level is a high level, prompting the user to pay attention to privacy protection, turning on a camera on the screen side of the device, recording an operation environment video, and uploading a viewing record and the operation environment video to the confidentiality center;

when a non-confidential device performs the sharing operation, parsing the images to generate unencrypted images, and deleting the unencrypted images after the sharing is completed; and when other applications read the encrypted images, prohibiting the operation.

The method further includes: providing the user with a one-click function to delete junk photos, where general screenshots and images that cannot be clearly classified, are fuzzy, or are randomly written by malicious applications are recognized as junk image data for one-click deletion, which helps the user quickly release a storage space.

The method further includes: enabling the user to perform quick retrieval based on tags added to the image data, which is convenient for the user to quickly find required content in a large amount of image data.

According to the specific embodiments provided by the present invention, the present invention discloses the following technical effects: the present invention provides a universal and highly intelligent photo album sorting and privacy protection method, which can effectively control confidential and private content and prevent the risk of abuse by malicious applications.

1. By recognizing characters, locations, and content, different photos can be sorted into different photo album content. For example, a separate photo album is automatically generated from photos captured at a tourist spot visited by a user. For another example, birthdays spent with relatives can be sorted into a separate photo album.

2. The user is provided with a high-level function to protect privacies such as various personal privacy-related documents (an identity card, a driver's license, a vehicle registration certificate, etc.) stored in the photo album, and such image data is automatically protected through content recognition.

3. In combination with locating, device authentication, content recognition and other technologies, image data generated by confidential institutions, persons, devices, etc. is automatically protected to prevent the leakage of state secrets.

4. The user is provided with a one-click function to delete junk photos. For example, recognized general screenshots or saved images and images that cannot be clearly classified can be recognized as junk image data for one-click deletion.

5. By adding tags to the image data, the user is provided with an ability of quick retrieval, such as document positioning, search by person, and search by trip.

BRIEF DESCRIPTION OF DRAWINGS

In order to more clearly illustrate the technical solution in the embodiments of the present invention or the prior art, the accompanying drawings that need to be used in the description of the embodiments or the prior art will be briefly introduced below. Apparently, the accompanying drawings in the description below merely illustrate the embodiments of the present invention. Those of ordinary skill in the art may also derive other accompanying drawings from the provided accompanying drawings without creative efforts.

The intelligent photo album sorting and privacy protection method according to the present invention is further described below with reference to the drawings, in which.

DETAILED DESCRIPTION OF THE EMBODIMENTS

Specific implementations of the present invention are further described in detail below in conjunction with the accompanying drawings and embodiments. The embodiments below are used to illustrate the present invention, but not to limit the scope of the present invention.

The present invention proposes an intelligent photo album sorting and privacy protection method. When there are a large number of pictures in a smart terminal (such as a mobile phone) of a user who has no habit of sorting the pictures, suddenly one day it will be very troublesome to look for a previously captured photo such as an identity card. By means of automatic sorting, data, persons, documents, and the like can be quickly found or searched for. In addition, the private information such as the identity card stored in a photo album of the mobile phone may be abused by malicious applications and is desired to be automatically protected. In the present invention, automatic tagging and sorting are performed after photos are captured or a photo album is opened. A specific implementation solution is as follows:

1. Images are automatically tagged and sorted using a series of technologies such as image recognition, large-scale modeling, natural language processing, and geographical location tagging.

2. The user is guided to tag the images recognized as persons or objects and perform modeling on the tagged content for automatic recognition in the next use, which is actually a process of artificial intelligence training.

In order to better understand the objective, structure, and function of the present invention, the present invention is further described in detail below with reference to the accompanying drawings.

Figure 1:
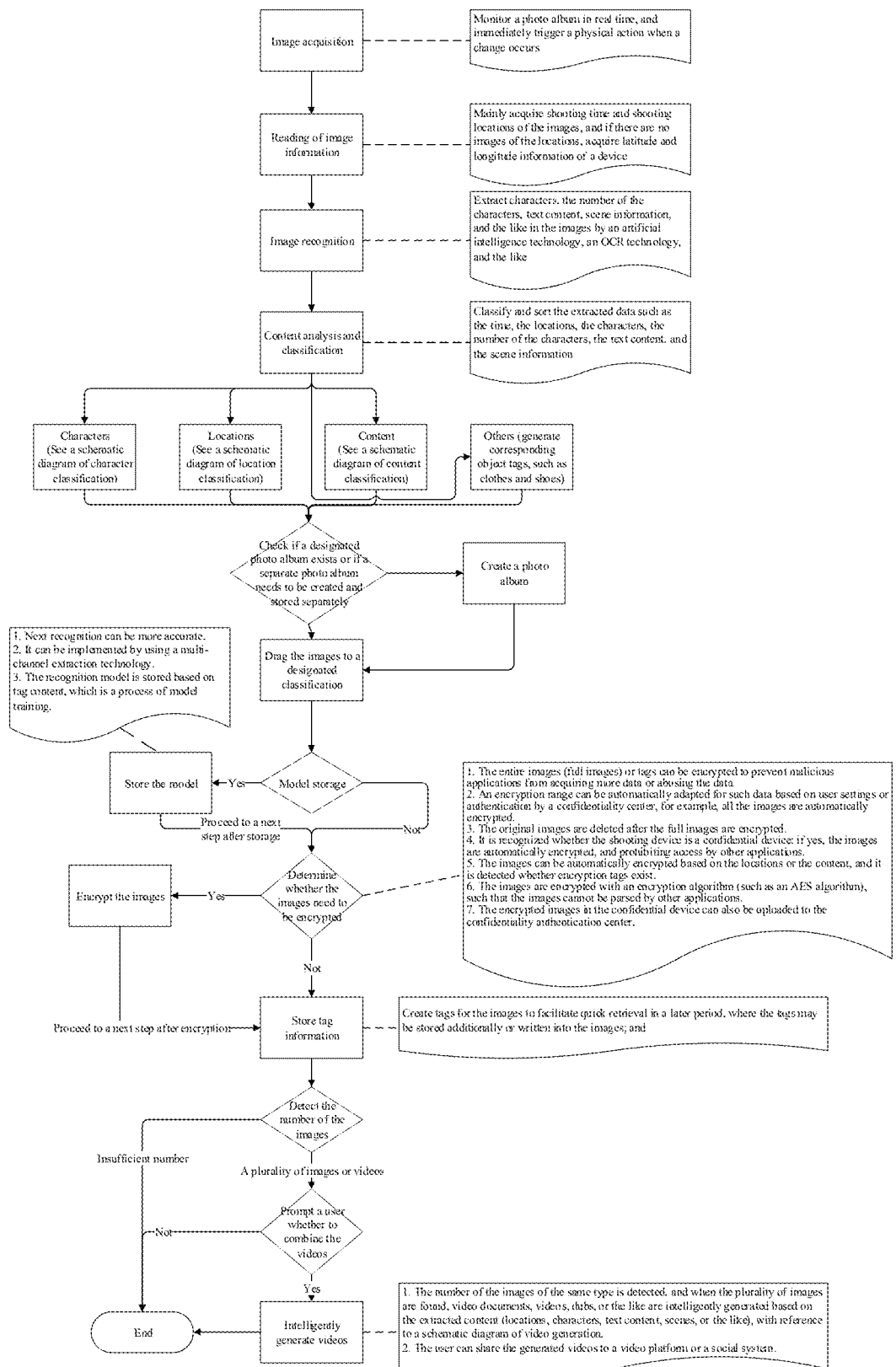
FIG. 1 is an overall flowchart of an intelligent photo album sorting and privacy protection method provided by the present invention.

As shown in FIG. 1, the present invention provides an intelligent photo album sorting and privacy protection method, where the method is applied to an image recognition model, and includes the following steps:

Step 1: monitoring a photo album in real time: acquiring images, and in response to monitoring that the images in the photo album are changed, immediately triggering a sorting action;

Step 2: reading image information: obtaining shooting time and shooting locations of the images, and acquiring latitude and longitude information of a shooting device;

Step 3: performing image recognition: extracting feature information in the images, where the feature information includes characters, the number of the characters, text content, and other scene information;

Step 4: performing content analysis and classification: performing classification and sorting based on the shooting time and the shooting locations of the images and the extracted feature information in the images, checking whether a designated classified photo album exists in the shooting device, and when the designated classified photo album exists, moving the images into the designated classified photo album; or when no designated classified photo album exists, prompting a user whether to create a designated classified photo album: if yes, creating the photo album, and moving the images into the designated classified photo album; or if not, temporarily abandoning the sorting, and waiting for next processing;

Step 5: performing model storage: after moving the images to the designated classified photo album, determining whether the recognition model has been stored in a model: if yes, proceeding to Step 6; or if not, storing the model, and then proceeding to a next step;

Step 6: performing image encryption: selecting whether to encrypt the images or not based on user settings and scene information: if yes, encrypting the images, and then proceeding to Step 7; or if not, directly proceeding to a next step;

Step 7: storing tag information: creating tags for the images to facilitate quick retrieval of the model in a later period, where the tags may be stored additionally or written into the images; and Step 8: performing image number detection: detecting the number of the images, and when a plurality of images or videos are detected, prompting the user whether to combine the videos: if yes, intelligently combining the videos; or if not, ending the process; and in response to detecting that the number of the images is insufficient, ending the process.

In order to further optimize the above technical effects, in the present invention, the number of the images of the same type is detected in intelligent video generation, and when the plurality of images are found, video documents, videos, dubs, or the like are intelligently generated based on the extracted content (locations, characters, text content, scenes, or the like); and the user can share the generated videos to a video platform or a social system.

Figure 2:
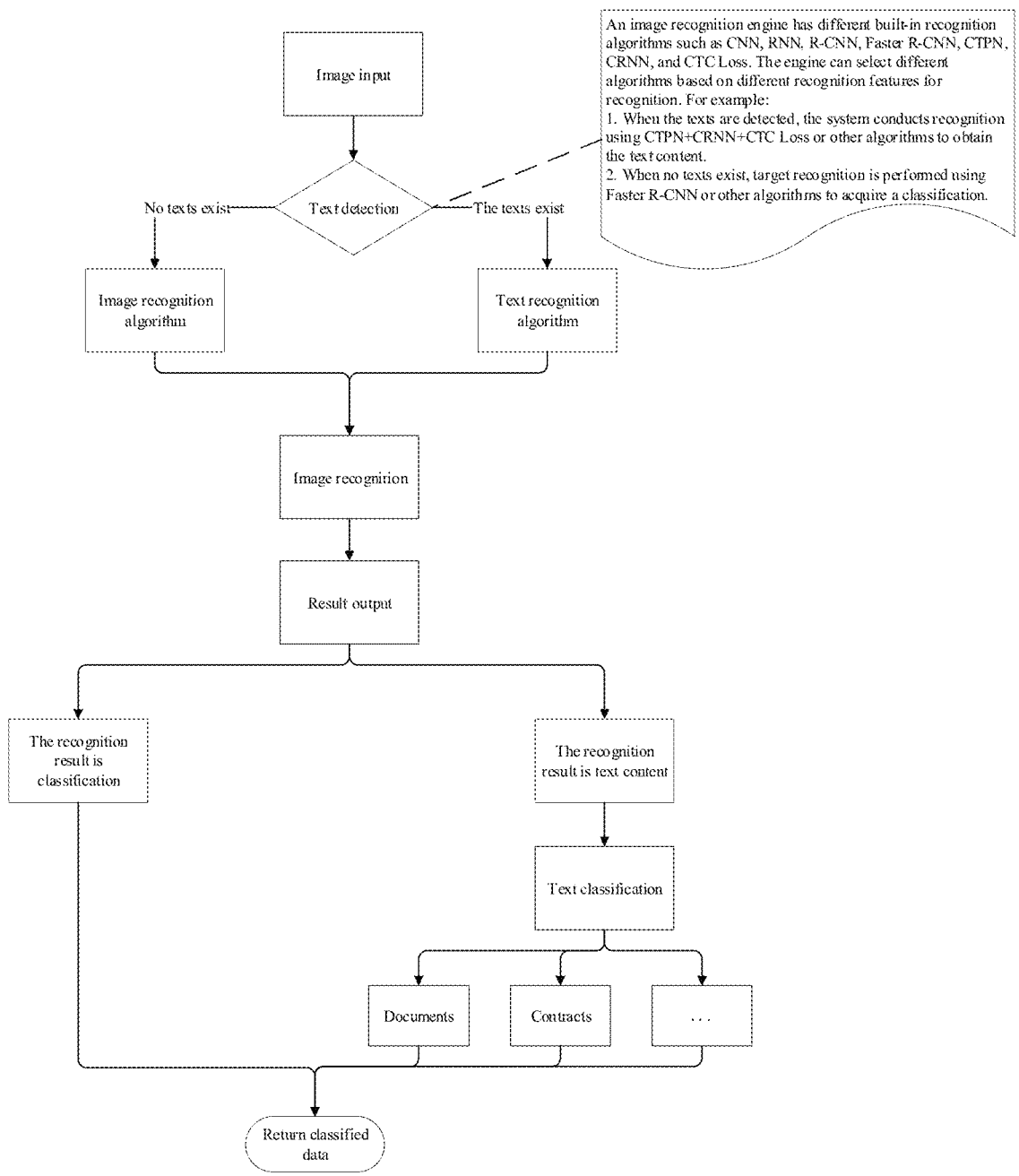
FIG. 2 is a flowchart of character classification in an intelligent photo album sorting and privacy protection method provided by the present invention.

Exemplarily, as shown in FIG. 2, the method for image recognition in the Step 3 includes:

Step 311: performing text detection on the image information: in response to detecting that texts exist in the images, recognizing the texts in the images by a text recognition algorithm, and outputting the text content based on a recognition result; or when no texts exist in the images, recognizing the image information by an image recognition algorithm, determining a classification of target images based on a recognition result, and returning classified data; and Step 312: performing text classification based on the recognized text content in the images, and returning classified data; and the Step 4 of content analysis and classification involves four major classifications: characters, locations, content, and others.

For example, an image recognition engine has different built-in recognition algorithms such as CNN, RNN, R-CNN, Faster R-CNN, CTPN, CRNN, and CTC Loss. The engine can select different algorithms based on different recognition features for recognition. For example: when the texts are detected, the system conducts recognition using CTPN+CRNN+CTC Loss or other algorithms to obtain the text content, determines whether the texts are documents, contracts, or other texts based on the text content, and performs corresponding classification on corresponding texts; or when no texts are detected, target recognition is performed using Faster R-CNN or other algorithms to acquire a classification.

Figure 3:
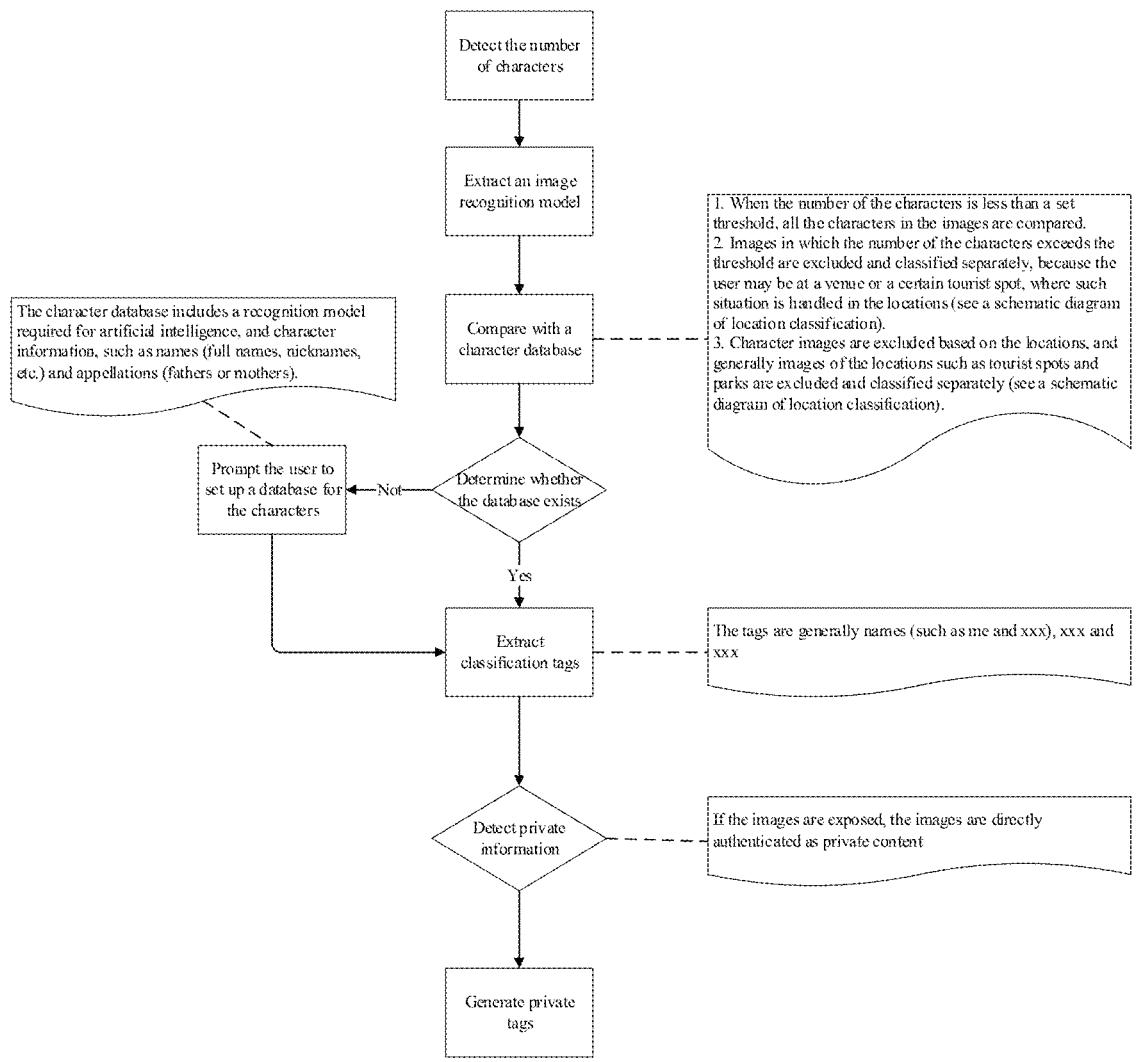
FIG. 3 is a flowchart of character number classification in an intelligent photo album sorting and privacy protection method provided by the present invention.

Exemplarily, as shown in FIG. 3, the method for classifying the characters includes:

Step 411: detecting the number of the characters in the images of the photo album;

Step 412: extracting information on the number of the characters in the images, recognizing by the image recognition model, and comparing with a character database in the image recognition model: when no contained character information exists in the character database, prompting the user to set up a database for the character information in the images, and after the user sets up the database for the character information in the images, extracting classification tags; or when contained character information exists in the database, directly extracting classification tags, where in order to further optimize the above technical solution, continuing to compare with a character database in the present invention specifically includes the following steps: 1: when the number of the characters is less than a set threshold, comparing all the characters in the images; 2: excluding images in which the number of the characters exceeds the threshold, and classifying them separately, because the user may be at a venue or a certain tourist spot, where such situation is handled in the locations; and 3: excluding character images based on the locations, generally excluding images of the locations such as tourist spots and parks, and classifying them separately; and the database set up for the characters includes a recognition model required for artificial intelligence, and character information, such as names (full names, nicknames, etc.) and appellations (fathers or mothers); and Step 413: monitoring private information of the character information in the images, and generating private tags.

In order to further optimize the above technical solution, in the present invention, if the images are exposed, the images are directly authenticated as private content.

Figure 4:
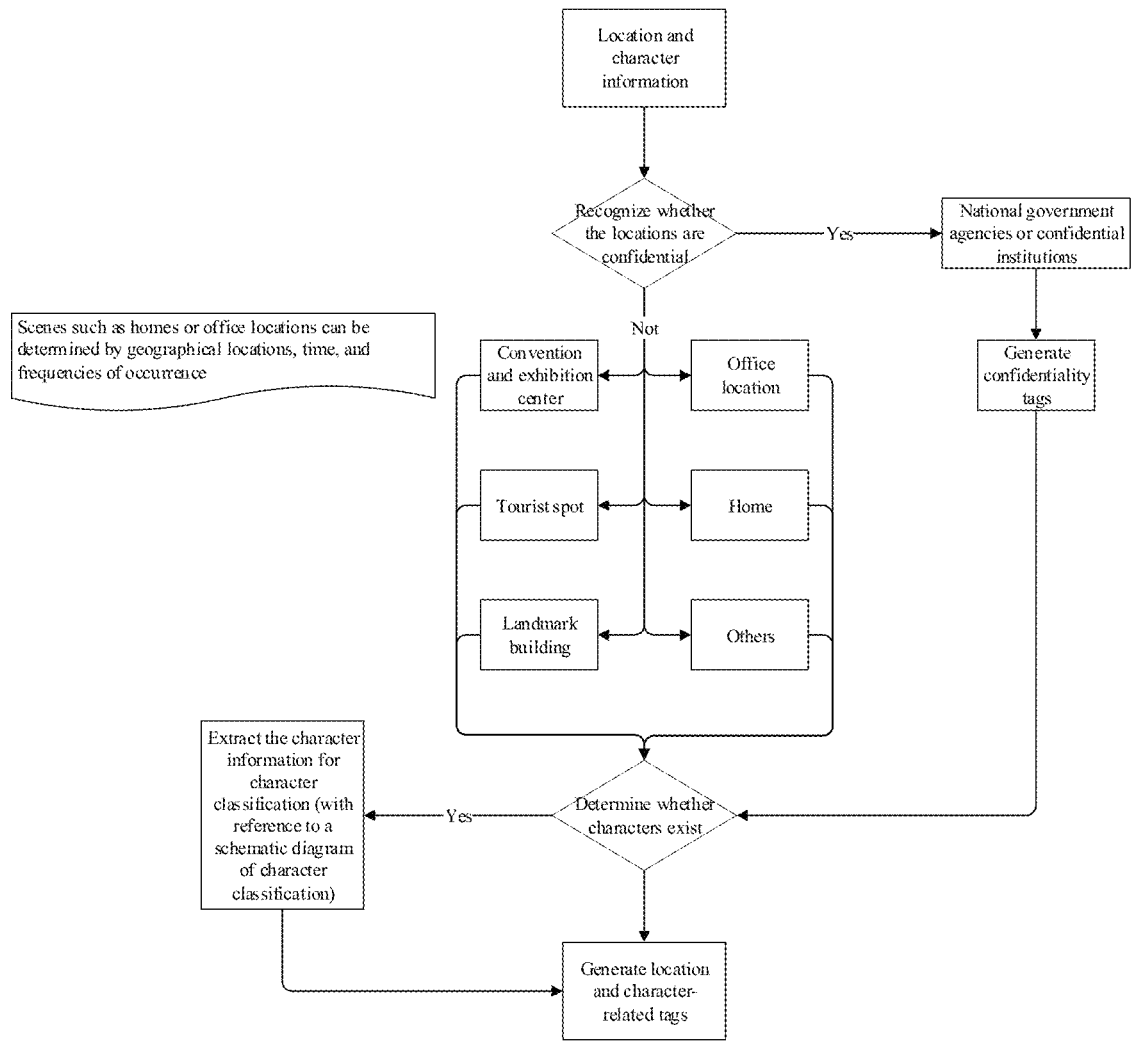
FIG. 4 is a flowchart of location and character classification in an intelligent photo album sorting and privacy protection method provided by the present invention.

Exemplarily, as shown in FIG. 4, the method for classifying the locations in the step S4 includes:

Step 421: recognizing whether the locations in the images are confidential: in response to recognizing that the locations in the images are confidential institutions, generating confidentiality tags, and recognizing whether the characters exist in the images: when the characters exist, extracting the character information in the images for character classification, and generating tags related to the locations and the characters; or when no characters exist in the images, generating tags related to the locations; and Step 422: in response to recognizing that the locations in the images are not confidential locations, detecting whether the characters exist in the images: in response to detecting that the characters exist in the images, extracting the character information in the images for character classification, and generating tags related to the locations and the characters; or when no characters exist in the images, generating tags related to the locations.

In order to further optimize the above technical solution, in the present invention, when it is recognized whether the locations are confidential, scenes such as homes or office locations can be determined by geographical locations, time, and frequencies of occurrence.

Figure 5:
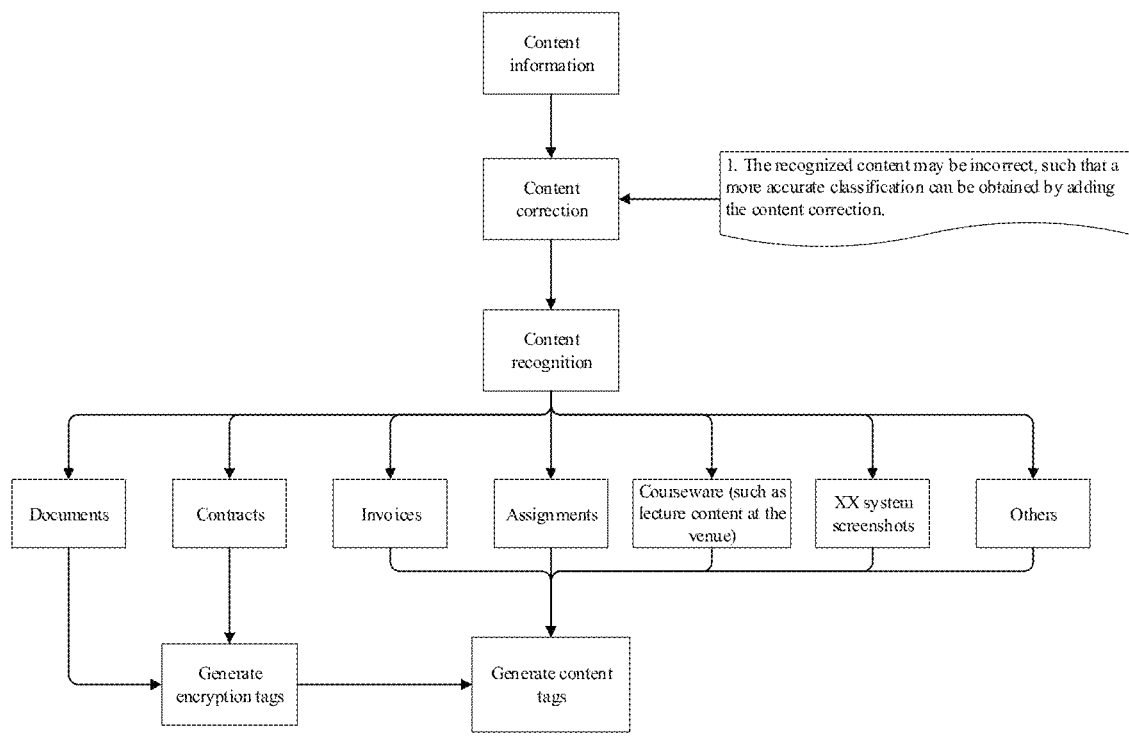
FIG. 5 is a flowchart of text content information classification in an intelligent photo album sorting and privacy protection method provided by the present invention.

Exemplarily, as shown in FIG. 5, the method for classifying the content includes:

Step 431: acquiring content information of the images in the photo album;

Step 432: performing content correction on the acquired content information in the images to obtain corrected content information;

Step 433: recognizing the corrected content information: recognizing information on documents, contracts, invoices, assignments, courseware, or system screenshots in the content information;

Step 434: in response to recognizing that the content information in the images is document or contract content, generating encryption tags, and generating content tags and full texts; and Step 435: in response to recognizing that the content information in the images refers to the invoices, the assignments, the courseware, or the system screenshots, directly generating content tags.

In order to further optimize the above technical solution, in the present invention, as shown in FIG. 3, the method for recognizing by the image recognition model and comparing with the character database in the Step 412 includes:
- when the number of the characters is less than a set threshold, comparing all the characters in the images;
- excluding images in which the number of the characters exceeds the set threshold; and
- excluding character images based on the locations.

Exemplarily, as shown in FIG. 1, performing image encryption on the images by an encryption algorithm in the Step 8 includes the following steps:
- Step 81: encrypting all the images based on the user settings to prevent unauthorized applications from acquiring image data;
- Step 82: automatically adapting an encryption range for confidential images based on the user settings or authentication by a confidentiality authentication center, for example, automatically encrypting all the images;
- Step 83: encrypting all the images, and then deleting the original images;
- Step 84: recognizing whether the shooting device is a confidential device: if yes, automatically encrypting the captured images, and prohibiting the images from being accessed by other applications;
- Step 85: automatically encrypting the images based on the shooting locations and content of the images, and determining whether encryption tags exist in the images;
- Step 86: when the encryption tags exist in the images, encrypting the images by the encryption algorithm, and ensuring that the encrypted images are incapable of being parsed by other applications; and
- Step 87: uploading an operation behavior for the encrypted images in the confidential device to the confidentiality authentication center.

Figure 6:
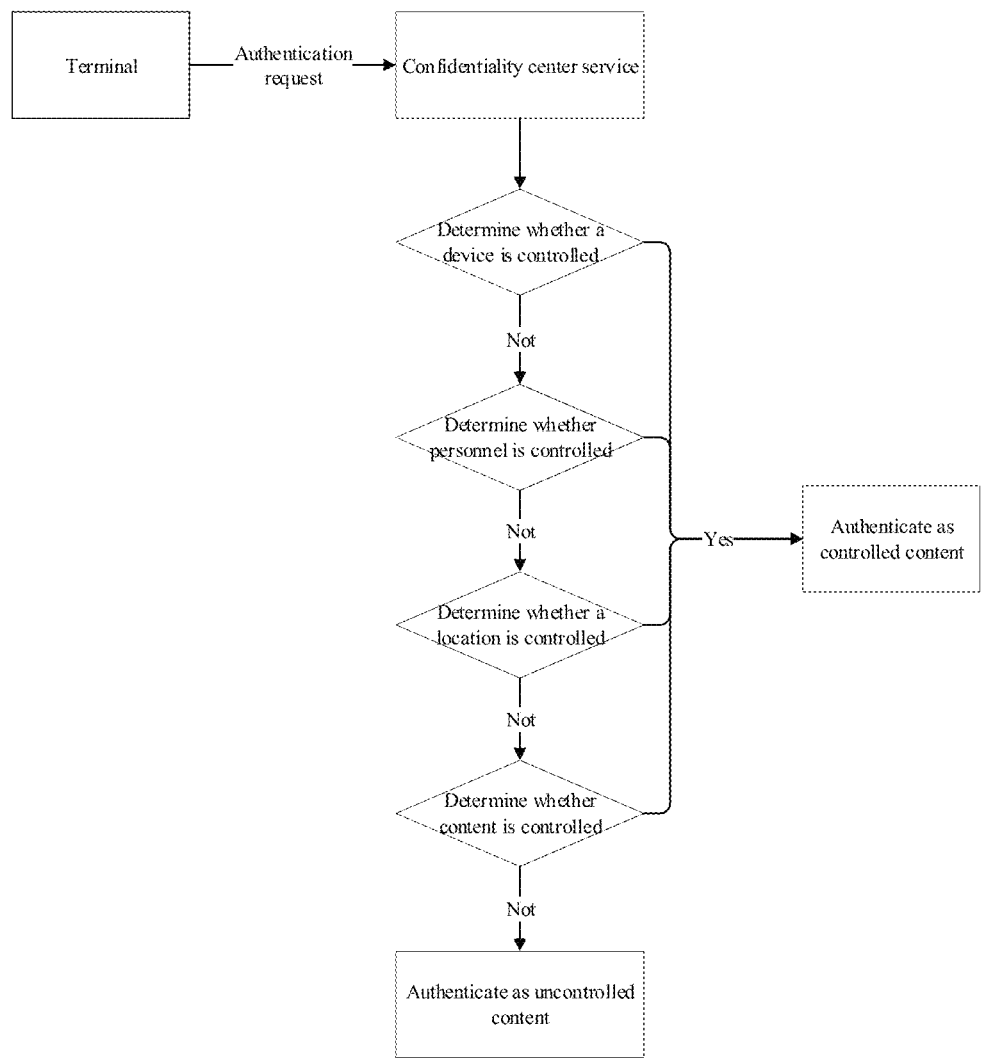
FIG. 6 is a flowchart of determination of controlled content in an intelligent photo album sorting and privacy protection method provided by the present invention.

Exemplarily, as shown in FIG. 6, a method for recognizing controlled content in the Step 82 includes:
- initiating an authentication request to the confidentiality center service by a shooting terminal, and separately detecting whether the shooting device, personnel in the images, the locations of the images, and the content of the images are the controlled content: if so, authenticating the shooting device, the personnel in the images, the locations of the images, and the content of the images as the controlled content; otherwise, authenticating the shooting device, the personnel in the images, the locations of the images, and the content of the images as uncontrolled content.

Figure 7:
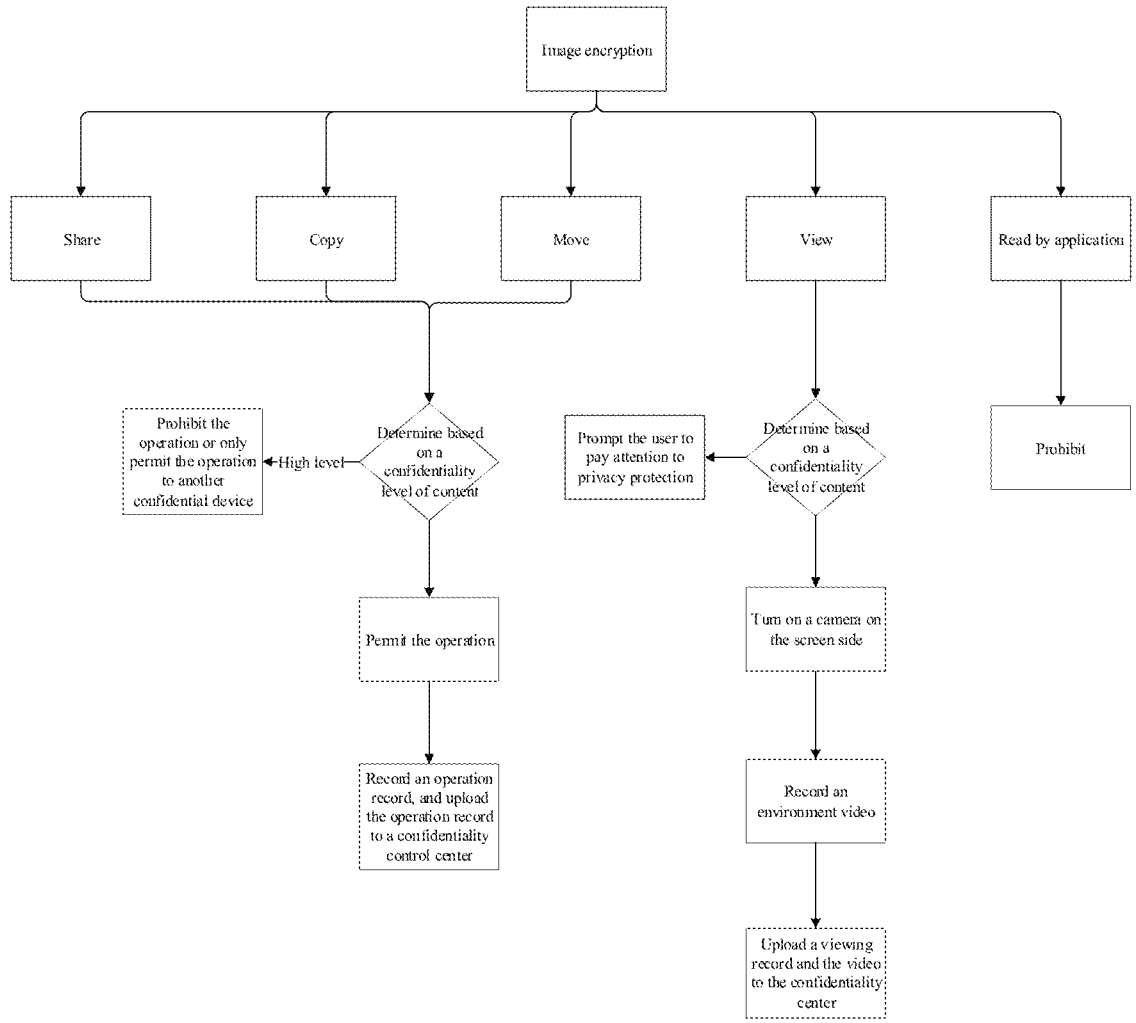
FIG. 7 is a flowchart of management of an operation behavior for encrypted images in an intelligent photo album sorting and privacy protection method provided by the present invention.

Exemplarily, as shown in FIG. 7, a method for managing the operation behavior for the encrypted images in the Step 87 includes:
- when a sharing, copying or moving operation is performed on the encrypted images in the images, determining based on a confidentiality level of the content: in response to determining that the confidentiality level is a high level, prohibiting the operation or only permitting the operation to another encryption device; or in response to determining that the confidentiality level is not a high level, permitting the operation, and recording an operation record and uploading the operation record to a confidentiality control center;
- when encrypted files in the images are viewed, determining based on the confidentiality level of the content: when the confidentiality level is a high level, prompting the user to pay attention to privacy protection, turning on a camera on the screen side of the device, recording an operation environment video, and uploading a viewing record and the operation environment video to the confidentiality center;
- when the encrypted images in the images are read by the applications, prohibiting the operation.

The method further includes: providing the user with a one-click function to delete junk photos, where general screenshots and images that cannot be clearly classified, are fuzzy, or are randomly written by malicious applications are recognized as junk image data for one-click deletion, which helps the user quickly release a storage space.

The method further includes: enabling the user to perform quick retrieval based on tags added to the image data, which is convenient for the user to quickly find required content in a large amount of image data. The above description of the disclosed embodiments enables those skilled in the art to implement or use the present invention. Various modifications to these embodiments will be apparent to those skilled in the art, and the general principles defined herein may be implemented in other embodiments without departing from the spirit or scope of the present invention. Therefore, the present invention will not be limited to these embodiments shown herein, but will fall within the widest scope consistent with the principles and novel characteristics disclosed herein.

What is claimed is:

1. A photo album sorting and privacy protection method, wherein the method is applied to an image recognition model, and comprises the following steps:
- Step 1: monitoring a photo album in real time: acquiring images, and in response to monitoring that the images in the photo album are changed, immediately triggering a sorting action;
- Step 2: reading image information: obtaining shooting time and shooting locations of the images, and acquiring latitude and longitude information of a shooting device;
- Step 3: performing image recognition: extracting feature information in the images, wherein the feature information comprises characters, the number of the characters, text content, and other scene information;
- Step 4: performing content analysis and classification: performing classification and sorting based on the shooting time and the shooting locations of the images and the extracted feature information in the images, checking whether a designated classified photo album exists in the shooting device, and when the designated classified photo album exists, moving the images into the designated classified photo album; or when no designated classified photo album exists, prompting a user whether to create a designated classified photo album: if yes, creating the photo album, and moving the images into the designated classified photo album;
- Step 5: performing model storage: after moving the images to the designated classified photo album, determining whether the image recognition model has been stored in a model: if yes, proceeding to Step 6; or if not, storing the image recognition model, and then proceeding to Step 6;
- Step 6: performing image encryption: selecting whether to encrypt the images or not based on user settings and scene information: if yes, encrypting the images, and then proceeding to Step 7; or if not, directly proceeding to Step 7, wherein performing image encryption on the images by an encryption algorithm in the Step 6 comprises the following steps:

Step 61: encrypting all the images based on the user settings to prevent unauthorized applications from acquiring image data;

Step 62: automatically adapting an encryption range for confidential images based on the user settings or authentication by a confidentiality authentication center;

Step 63: encrypting all the images, and then deleting the original images;

Step 64: recognizing whether the shooting device is a confidential device: if yes, automatically encrypting the captured images, and prohibiting the images from being accessed by other applications;

Step 65: automatically encrypting the images based on the shooting locations and content of the images, and determining whether encryption tags exist in the images;

Step 66: when the encryption tags exist in the images, encrypting the images by the encryption algorithm; and Step 67: uploading an operation behavior for the encrypted images in the confidential device to the confidentiality authentication center, wherein a method for recognizing controlled content authenticated by the confidentiality authentication center in the Step 62 comprises:

initiating an authentication request to a confidentiality center service by a shooting terminal, and separately detecting whether the shooting device, personnel in the images, the locations of the images, and the content of the images are the controlled content: if so, authenticating the shooting device, the personnel in the images, the locations of the images, and the content of the images as the controlled content; otherwise, authenticating the shooting device, the personnel in the images, the locations of the images, and the content of the images as uncontrolled content;

wherein a method for managing the operation behavior for the encrypted images in the Step 67 comprises:

when an operation is performed on the encrypted images in the images, determining based on a confidentiality level of the content, the operation including sharing, copying or moving: in response to determining that the confidentiality level is greater than a threshold, prohibiting the operation or only permitting the operation to another encryption device; or in response to determining that the confidentiality level is not greater than the threshold, permitting the operation, and recording an operation record and uploading the operation record to a confidentiality control center;

when encrypted files in the images are viewed, determining based on the confidentiality level of the content: when the confidentiality level is a greater than the threshold, prompting the user to pay attention to privacy protection, turning on a camera, recording an operation environment video, and uploading a viewing record and the operation environment video to a confidentiality center;

when a non-confidential device performs the sharing operation, parsing the images to generate unencrypted images, and deleting the unencrypted images after the sharing is completed; and when other applications read the encrypted images, prohibiting the operation;

Step 7: storing tag information: creating identification tags for the images, wherein the identification tags are capable of being stored additionally or written into the images, and used for retrieval of the model; and Step 8: performing image number detection: detecting the number of the images, and when a plurality of images or videos are detected, prompting the user whether to combine the videos: if yes, combining the videos;

the method further comprises: providing the user with a one-click function to delete junk photos; and the method further comprises: enabling the user to perform retrieval based on identification tags added to the image data.

2. The photo album sorting and privacy protection method according to claim 1, wherein the method for image recognition in the Step 3 comprises:

Step 311: performing text detection on the image information: in response to detecting that texts exist in the images, recognizing the texts in the images by a text recognition algorithm, and outputting the text content based on a recognition result; or when no texts exist in the images, recognizing the image information by an image recognition algorithm, determining a classification of target images based on a recognition result, and returning classified data; and Step 312: performing text classification based on the recognized text content in the images, and returning classified data; and the Step 4 of content analysis and classification involves four major classifications: characters, locations, content, and others.

3. The photo album sorting and privacy protection method according to claim 2, wherein the method for classifying the characters comprises:

Step 411: detecting the number of the characters in the images of the photo album;

Step 412: extracting information on the number of the characters in the images, recognizing by the image recognition model, and comparing with a character database in the image recognition model: when no contained character information exists in the character database, prompting the user to set up a database for the character information in the images, and after the user sets up the database for the character information in the images, extracting classification tags; or when contained character information exists in the database, directly extracting classification tags; and Step 413: monitoring private information of the character information in the images, and generating private tags.

4. The photo album sorting and privacy protection method according to claim 2, wherein the method for classifying the locations in the Step 4 comprises:

S421: recognizing whether the locations in the images are confidential: in response to recognizing that the locations in the images are confidential institutions, generating confidentiality tags, and recognizing whether the characters exist in the images: when the characters exist, extracting the character information in the images for character classification, and generating tags related to the locations and the characters; or when no characters exist in the images, generating tags related to the locations; and Step 422: in response to recognizing that the locations in the images are not confidential locations, detecting whether the characters exist in the images: in response to detecting that the characters exist in the images, extracting the character information in the images for character classification, and generating tags related to the locations and the characters; or when no characters exist in the images, generating tags related to the locations.

5. The photo album sorting and privacy protection method according to claim 2, wherein the method for classifying the content comprises:
- Step 431: acquiring content information of the images in the photo album;
- Step 432: performing content correction on the acquired content information in the images to obtain corrected content information;
- Step 433: recognizing the corrected content information: recognizing information on documents, contracts, invoices, assignments, courseware, or system screenshots in the content information;
- Step 434: in response to recognizing that the content information in the images is document or contract content, generating encryption tags, and generating content tags and full texts; and
- Step 435: in response to recognizing that the content information in the images refers to the invoices, the assignments, the courseware, or the system screenshots, directly generating content tags.

* * * * *